United States Patent
Morikawa et al.

(10) Patent No.: US 10,005,373 B2
(45) Date of Patent: Jun. 26, 2018

(54) BATTERY CONTROL SYSTEM AND VEHICLE CONTROL SYSTEM

(71) Applicants: HITACHI AUTOMOTIVE SYSTEMS, LTD., Hitachinaka-shi, Ibaraki (JP); NISSAN MOTOR CO., LTD., Yokohama-shi, Kanagawa (JP)

(72) Inventors: Hiroshi Morikawa, Hitachinaka (JP); Yoshinori Aoshima, Hitachinaka (JP); Masayuki Takada, Hitachinaka (JP); Kenichiro Tsuru, Hitachinaka (JP); Shigeyuki Kiyota, Kanagawa (JP); Yoshiyuki Tanaka, Kanagawa (JP); Toyoki Iguchi, Kanagawa (JP); Hiroaki Hashimoto, Kanagawa (JP); Yasuyuki Takahashi, Kanagawa (JP)

(73) Assignees: HITACHI AUTOMOTIVE SYSTEMS, LTD., Ibaraki (JP); NISSAN MOTOR CO., LTD., Kanagawa (JP)

(*) Notice: Subject to any disclaimer, the term of this patent is extended or adjusted under 35 U.S.C. 154(b) by 115 days.

(21) Appl. No.: 14/909,619

(22) PCT Filed: Jul. 25, 2014

(86) PCT No.: PCT/JP2014/069732
§ 371 (c)(1),
(2) Date: Feb. 2, 2016

(87) PCT Pub. No.: WO2015/019874
PCT Pub. Date: Feb. 12, 2015

(65) Prior Publication Data
US 2016/0176308 A1 Jun. 23, 2016

(30) Foreign Application Priority Data
Aug. 9, 2013 (JP) .................................. 2013-166800

(51) Int. Cl.
*B60L 11/18* (2006.01)
*H02J 7/00* (2006.01)
(Continued)

(52) U.S. Cl.
CPC ......... *B60L 11/1861* (2013.01); *B60L 3/0046* (2013.01); *B60L 3/12* (2013.01);
(Continued)

(58) Field of Classification Search
CPC ...................................................... H02J 7/007
(Continued)

(56) References Cited

U.S. PATENT DOCUMENTS 3,617,851 A 11/1971 Dupuy et al.
6,232,748 B1* 5/2001 Kinoshita ............... B60K 6/485
320/132
(Continued)

FOREIGN PATENT DOCUMENTS

CN 1616981 A 5/2005
DE 102011120023 A1 9/2012
(Continued)

OTHER PUBLICATIONS

Japanese Office Action for Japanese Application No. 2015-530820 dated Mar. 17, 2017.
(Continued)

*Primary Examiner* — Samuel Berhanu
*Assistant Examiner* — Tessema Kebede
(74) *Attorney, Agent, or Firm* — Volpe and Koenig, P.C.

(57) ABSTRACT

A battery control system connected to a battery, which controls charge/discharge at the battery, includes: a current detection unit that measures a current value by detecting a charge/discharge current flowing through the battery; a voltage detection unit that detects a voltage at the battery; a temperature detection unit that detects a temperature at the
(Continued)

battery; a temperature history recording unit that records temperature history pertaining to the temperature detected by the temperature detection unit; and a charge/discharge restriction unit that restricts the charge/discharge current in a low-temperature state based upon the temperature history recorded by the temperature history recording unit.

10 Claims, 10 Drawing Sheets

(51) Int. Cl.
    *H02J 7/04* (2006.01)
    *B60L 3/00* (2006.01)
    *B60L 3/12* (2006.01)

(52) U.S. Cl.
    CPC ....... *B60L 11/1803* (2013.01); *B60L 11/1857* (2013.01); *B60L 11/1864* (2013.01); *B60L 11/1872* (2013.01); *H02J 7/00* (2013.01); *H02J 7/007* (2013.01); *H02J 7/04* (2013.01); *B60L 2240/545* (2013.01); *B60L 2240/547* (2013.01); *B60L 2240/549* (2013.01); *B60L 2240/80* (2013.01); *Y02T 10/7011* (2013.01); *Y02T 10/7016* (2013.01); *Y02T 10/7044* (2013.01); *Y02T 10/7061* (2013.01)

(58) Field of Classification Search
    USPC ........................................................ 320/134
    See application file for complete search history.

(56) References Cited

U.S. PATENT DOCUMENTS

| | | | | |
|---|---|---|---|---|
| 8,305,044 | B2* | 11/2012 | Kawamoto | H01M 10/425 320/152 |
| 2005/0189919 | A1 | 9/2005 | Tsuchiya et al. | |
| 2011/0267009 | A1* | 11/2011 | Nakatsuji | H01M 2/34 320/152 |
| 2011/0316486 | A1* | 12/2011 | Inaba | B60L 1/003 320/150 |
| 2012/0081077 | A1* | 4/2012 | Sasaki | H01M 10/425 320/134 |
| 2012/0098497 | A1* | 4/2012 | Ogane | B60K 6/485 320/134 |
| 2013/0107404 | A1 | 5/2013 | Hamai | |

FOREIGN PATENT DOCUMENTS

| | | |
|---|---|---|
| EP | 2387093 A1 | 11/2011 |
| JP | 2009-207312 A | 9/2009 |
| JP | 2011-222133 A | 11/2011 |
| JP | 2011230671 A | 11/2011 |
| JP | 2012-013472 A | 1/2012 |
| JP | 2012-016147 A | 1/2012 |
| RU | 127521 U1 | 10/2012 |

OTHER PUBLICATIONS

Russian Search Report for Russian Application No. 2016103958 dated Mar. 23, 2017.
European Search Report for European Application No. 14834054.0 dated Apr. 5, 2017.
Zang Jinling "Research on Smart Battery System for Electric Vehicle". Chinese Outstanding Masterchar (39)s Degree Thesis Full-Text Database The Electronic Journal. 2010 the 10th phases., on Oct. 15, 2010.
The Chinese Office Action dated Aug. 1, 2017 for the Chinsese Application No. 201480044129.0.

* cited by examiner

FIG.7

| TEMPERATURE | CURRENT | 30 MIN PREVIOUS | 1 HOUR PREVIOUS | 1.5 HOURS PREVIOUS | 2 HOURS PREVIOUS |
|---|---|---|---|---|---|
| | −9°C | −10°C | −12°C | −15°C | −28°C |

FIG.8

| | CURRENT | 30 MIN PREVIOUS | 1 HOUR PREVIOUS | 1.5 HOURS PREVIOUS | 2 HOURS PREVIOUS | 2.5 HOURS PREVIOUS | 3 HOURS PREVIOUS |
|---|---|---|---|---|---|---|---|
| TEMPERATURE | −9°C | −10°C | × | −15°C | × | −22°C | −25°C |

FIG.9

| CONTINUOUS TIME LENGTH | 2 HOURS | 4 HOURS | 8 HOURS |
|---|---|---|---|
| TEMPERATURE THRESHOLD VALUE | FIRST PHASE (FIRST THRESHOLD VALUE) | 5°C | 15°C | 25°C |
| | SECOND PHASE (SECOND THRESHOLD VALUE) | −5°C | 0°C | 5°C |

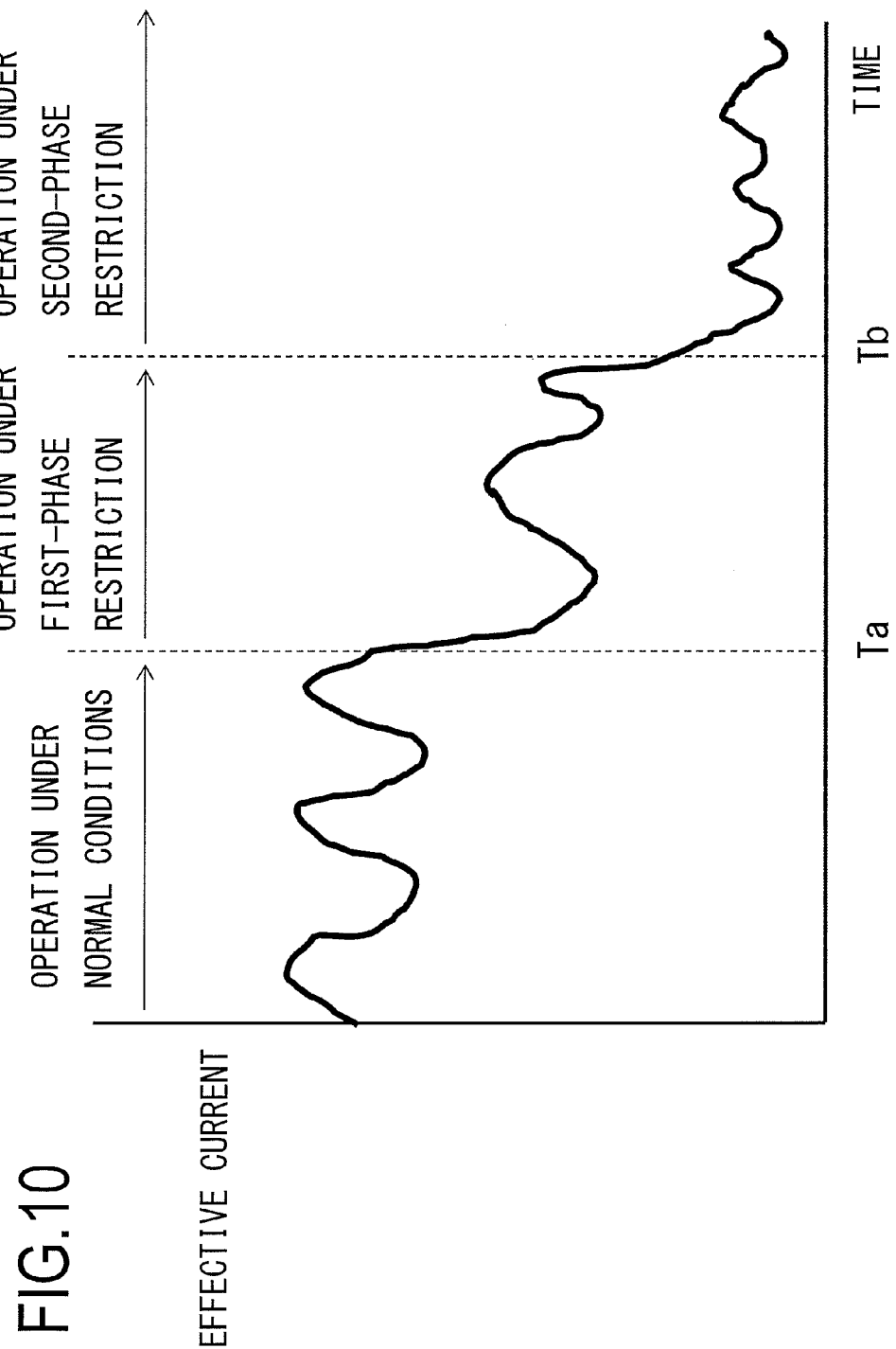

BATTERY CONTROL SYSTEM AND VEHICLE CONTROL SYSTEM

TECHNICAL FIELD

The present invention relates to a battery control system and a vehicle control system.

BACKGROUND ART

Heat is generated at a secondary battery such as a lithium-ion battery as it is charged or discharged. An excessive rise in the battery temperature resulting from heat generation will adversely affect the battery performance. For instance, the battery output characteristics are likely to become degraded. In a device proposed in the related art in order to address this issue, the highest temperature inside a battery pack configured by combining a plurality of lithium-ion batteries is estimated and the input/output power at the battery pack is restricted based upon the estimation results (PTL 1).

CITATION LIST

Patent Literature

PTL 1: Japanese Laid Open Patent Publication No. 2011-222133

SUMMARY OF INVENTION

Technical Problem

At a secondary battery such as a lithium-ion battery, the battery voltage becomes lower and consequently, the electric current that can be charged/discharged becomes smaller when the battery temperature is lower. For this reason, it is desirable to impose a charge/discharge restriction when the battery is in a low-temperature state in such a manner that while the charge/discharge current is restricted in the low-temperature state, the charge/discharge current restriction is eased once the battery temperature rises due to heat generation occurring during charge/discharge. However, in the device disclosed in PTL 1, which is designed to prevent an increase in the battery temperature, a charge/discharge restriction in a low-temperature state such as that described above cannot be imposed in an optimal manner.

Solution to Problem

According to the 1st aspect of the present invention, a battery control system connected to a battery, which controls charge/discharge at the battery, comprises: a current detection unit that measures a current value by detecting a charge/discharge current flowing through the battery; a voltage detection unit that detects a voltage at the battery; a temperature detection unit that detects a temperature at the battery; a temperature history recording unit that records temperature history pertaining to the temperature detected by the temperature detection unit; and a charge/discharge restriction unit that restricts the charge/discharge current in a low-temperature state based upon the temperature history recorded by the temperature history recording unit.

According to the 2nd aspect of the present invention, in the battery control system according to the 1st aspect, it is preferred that: the charge/discharge restriction unit makes a decision as to whether or not to restrict the charge/discharge current by determining, based upon the temperature history, a highest temperature at the battery as the battery is charged/discharged continuously or intermittently over a length of time equal to or greater than a predetermined continuous time length and comparing the highest temperature with a predetermined threshold value.

According to the 3rd aspect of the present invention, in the battery control system according to the 2nd aspect, it is preferred that: the continuous time length is set in correspondence to a length of time to elapse until the temperature at the battery enters a state of equilibrium during charge/discharge.

According to the 4th aspect of the present invention, in the battery control system according to the 2nd or the 3rd aspect, it is preferred that: a plurality of varying time lengths are set for the continuous time length; and the threshold value takes a greater value in correspondence to the continuous time length as the continuous time length increases.

According to the 5th aspect of the present invention, in the battery control system according to any one of the 2nd through 4th aspects, it is preferred that: a first threshold value and a second threshold value lower than the first threshold value are set to be used as the threshold value; and the charge/discharge restriction unit imposes a first charge/discharge restriction so as to restrict the charge/discharge current if the highest temperature is lower than the first threshold value and imposes a second charge/discharge restriction so as to further restrict the charge/discharge current if the highest temperature is lower than the second threshold value.

According to the 6th aspect of the present invention, in the battery control system according to the 5th aspect, it is preferred that: the charge/discharge restriction unit, having imposed the first charge/discharge restriction, clears the first charge/discharge restriction when the highest temperature subsequently exceeds the first threshold value, and having imposed the second charge/discharge restriction, sustains the second charge/discharge restriction even if the highest temperature subsequently exceeds the second threshold value.

According to the 7th aspect of the present invention, in the battery control system according to the 6th aspect, it is preferred that: the charge/discharge restriction unit clears the second charge/discharge restriction once a length of elapsed time having elapsed since the second charge/discharge restriction came into effect or a total length of time over which the second charge/discharge restriction has been in effect exceeds a predetermined restriction clearance time.

According to the 8th aspect of the present invention, in the battery control system according to the 7th aspect, it is preferred that: the battery control system is connected to an in-vehicle communication network; and the charge/discharge restriction unit obtains information pertaining to the length of elapsed time or the total length of time via the communication network.

According to the 9th aspect of the present invention, in the battery control system according to any one of the 1st through 8th aspects, it is preferred that: the battery control system further comprises an effective current value calculation unit that calculates, based upon the current value measured by the current detection unit, an effective current value in a predetermined time window; and when the effective current value calculated by the effective current value calculation unit is less than a predetermined reference value, the temperature history recording unit does not record the temperature history.

According to the 10th aspect of the present invention, a vehicle control system comprises: a battery control system connected to a battery, which controls charge/discharge at the battery; and a vehicle control unit connected with the battery control system, wherein: the battery control system includes a current detection unit that detects a charge/discharge current flowing through the battery, a voltage detection unit that detects a voltage at the battery, a temperature detection unit that detects a temperature at the battery and a temperature history recording unit that records a temperature history pertaining to the temperature detected by the temperature detection unit; and the vehicle control unit issues, based upon the temperature history recorded by the temperature history recording unit, an instruction for the battery control system so as to restrict the charge/discharge current in a low-temperature state.

Advantageous Effect of the Invention

According to the present invention, an optimal charge/discharge restriction can be imposed in a low-temperature state.

DESCRIPTION OF EMBODIMENTS

The following is a description of an embodiment of the present invention, given in reference to drawings. The embodiment will be described below in reference to an example of the present invention adopted in a battery system configuring a power source in a hybrid vehicle (HEV).

In addition, while the embodiment will be described by assuming that the present invention is adopted in conjunction with lithium-ion batteries, the present invention may be otherwise adopted in conjunction with nickel hydrogen batteries, lead-acid batteries, electric double layer capacitors or hybrid capacitors. It is to be noted that while the assembled battery in the embodiment described below is configured by connecting battery cells in series, the assembled battery may instead be configured by connecting in series groups of battery cells each comprised of battery cells connected in parallel or the assembled battery may be configured by connecting in parallel groups of battery cells each comprised of battery cells connected in series.

Figure 1:
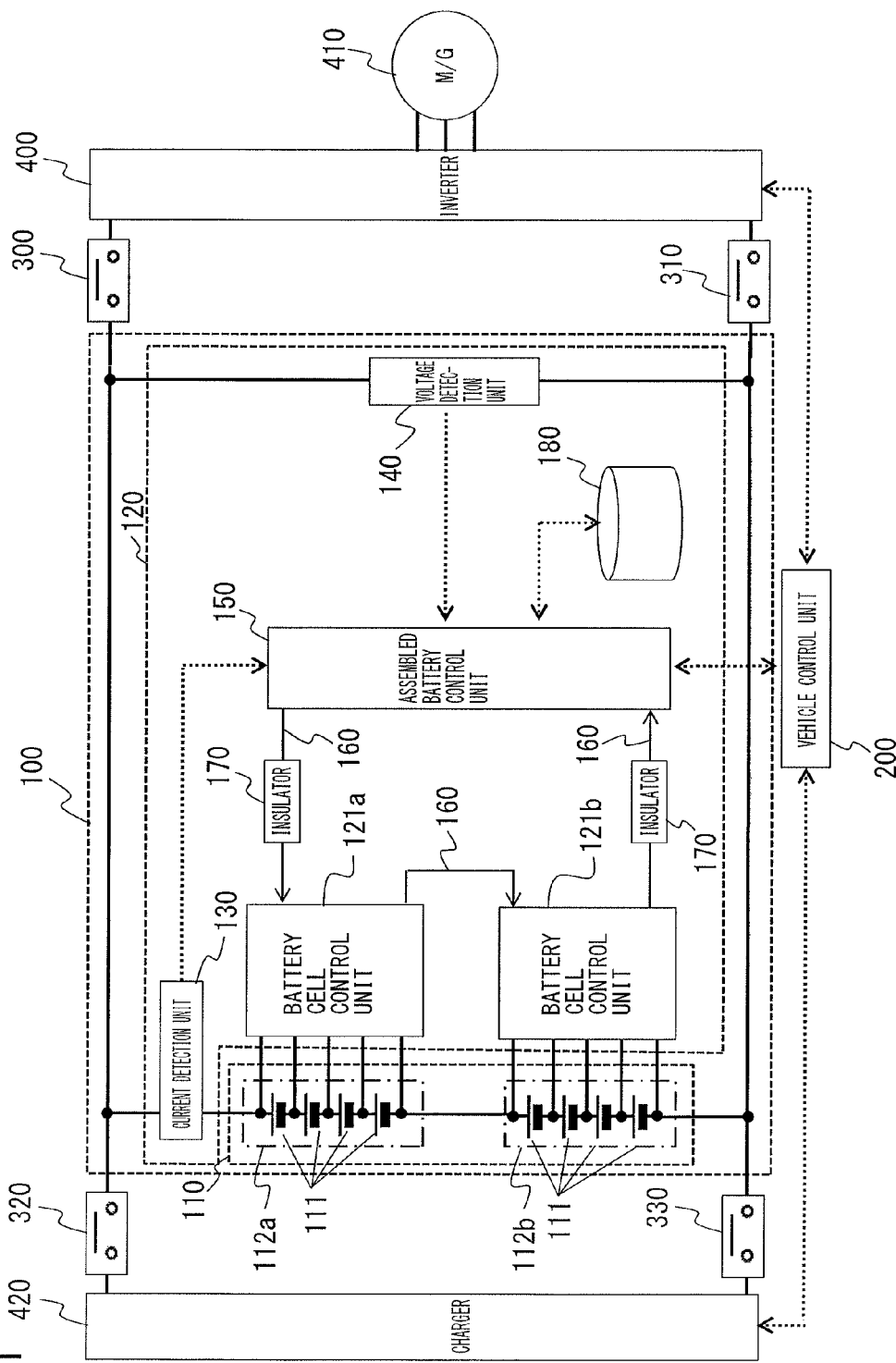
FIG. 1 A diagram showing a configuration comprising a battery system 100 that includes a battery control system 120 achieved in an embodiment of the present invention and peripheral devices FIG. 2 A diagram showing the circuit structure of the battery cell control unit 121a FIG. 3 A diagram presenting an example of a relationship that may be achieved by the temperature and the allowable value set for the effective current at a battery FIG. 4 A diagram presenting an example of a relationship that may be achieved by the number of battery operation cycles and the extent of degradation FIG. 5 A diagram showing the control blocks in the assembled battery control unit 150, which are involved in charge/discharge restrictions FIG. 6 A flowchart of the processing executed for the charge/discharge restrictions FIG. 7 An example of the temperature history table FIG. 8 Another example of the temperature history table FIG. 9 A chart presenting examples of values that may be set for the first and second threshold values in correspondence to the continuous time length FIG. 10 A diagram illustrating how the effective current may change when the first-phase and second-phase charge/discharge restrictions are imposed

FIG. 1 is a diagram showing a configuration comprising a battery system 100 that includes a battery control system 120 achieved in an embodiment of the present invention and peripheral devices. The battery system 100 is connected to an inverter 400 via relays 300 and 310. The battery system 100 comprises an assembled battery 110 and the battery control system 120. The battery control system 120 includes battery cell control units 121a and 121b, a current detection unit 130, a voltage detection unit 140, an assembled battery control unit 150 and a storage unit 180.

The assembled battery 110 is configured by connecting in series battery cell groups 112a and 112b each made up with a plurality of battery cells 111. The battery cell control units 121a and 121b, which are respectively connected with the battery cell groups 112a and 112b, detect the cell voltages (voltages across the individual battery cells) and temperatures at the individual battery cells 111 in the corresponding battery cell groups and transmit signals indicating detection results to the assembled battery control unit 150 via signal communication paths 160 and insulator elements 170. It is to be noted that the insulator elements 170 may be constituted with, for instance, photo-couplers.

The current detection unit 130 detects the current flowing through the assembled battery 110 and measures the value of the current. The voltage detection unit 140 detects the voltage across the assembled battery 110, i.e., the voltage representing the total sum of the voltages at the battery cells 111 connected in series in the assembled battery 110.

Based upon the signals transmitted from the battery cell control units 121a and 121b, the assembled battery control unit 150 obtains the cell voltages and the temperatures at the individual battery cells 111. In addition, it individually receives the current value measured for the current flowing through the assembled battery 110 from the current detection unit 130 and the total voltage value for the assembled battery 110 from the voltage detection unit 140. Based upon the information thus received, the assembled battery control unit 150 detects conditions at the assembled battery 110 and controls the assembled battery 110 accordingly. The detection results indicating the conditions of the assembled battery 110 detected by the assembled battery control unit 150 are transmitted to a vehicle control unit 200 and to the battery cell control units 121a and 121b.

The assembled battery 110 is configured by electrically connecting in series a plurality of battery cells 111 capable of accumulating and releasing electric energy (capable of charging/discharging DC power). In order to facilitate management and control of the conditions at the battery cells 111 configuring the assembled battery 110, the battery cells 111 are divided into groups each made up with a predetermined unit number of cells. The battery cells 111 in each group are electrically connected in series and form the battery cell group 112a or 112b. It is to be noted that all the battery cell groups 112 may be made up with a uniform number of battery cells 111, or the number of battery cells 111 in a given battery cell group 112 may be different from the number of battery cells 111 in another battery cell group 112. For purposes of simplification, the embodiment will be described by assuming that the battery cell groups 112a and 112b, each formed by electrically connecting four battery cells 111 in series are electrically connected in series in the assembled battery 110 having a total of eight battery cells 111 as illustrated in FIG. 1.

The communication method adopted to enable the assembled battery control unit 150 to communicate with the battery cell control units 121a and 121b will be described next. The battery cell control units 121a and 121b are connected in series in an order conforming to the order in which the potentials at the battery cell groups 112a and 112b, respectively monitored by them, shift from high to low. A signal transmitted from the assembled battery control unit 150 is input to the battery cell control unit 121a via an insulator element 170 and a signal communication path 160. An output from the battery cell control unit 121a is input to the battery cell control unit 121b via a signal communication path 160. An output from the lowest-order battery cell control unit 121b is transmitted to the assembled battery control unit 150 via an insulator element 170 and a signal communication path 160. It is to be noted that while no insulator element is disposed between the battery cell control unit 121a and the battery cell control unit 121b in the embodiment, signals may be transmitted/received between these battery cell control units via an insulator element as well.

Various types of information required by the assembled battery control unit 150 for control of the assembled battery 110 are stored and held in the storage unit 180. For instance, information related to the state of charge (SOC) of each battery cell 111, information related to the internal resistance in each battery cell 111 and the like are stored in the storage unit 180.

The assembled battery control unit 150 executes various types of processing and arithmetic operations in order to control the assembled battery 110 by using information individually received from the battery cell control units 121a and 121b, the current detection unit 130, the voltage detection unit 140 and the vehicle control unit 200, the information stored in the storage unit 180 and the like. It executes, for instance, an arithmetic operation to determine the SOC or the state of health (SOH) of each battery cell 111, an arithmetic operation to determine the allowable power that can be charged/discharged at the assembled battery 110, decision-making with regard to any abnormality in the assembled battery 110 and an arithmetic operation for purposes of charge/discharge quantity control at the assembled battery 110. Then, based upon the arithmetic operation results, it outputs information needed for control of the assembled battery 110 to the vehicle control unit 200 and to the battery cell control units 121a and 121b. It is to be noted that the assembled battery control unit 150 and the vehicle control unit 200 are both connected to an in-vehicle communication network referred to as a CAN (controller area network) and are thus able to transmit/receive information to/from each other via the network.

The vehicle control unit 200 controls the inverter 400 connected to the battery system 100 via the relays 300 and 310 by using the information transmitted thereto from the assembled battery control unit 150. While the vehicle is in a traveling state, the battery system 100 is connected to the inverter 400. The inverter 400 drives a motor generator 410 with the energy stored in the assembled battery 110 in the battery system 100.

When the vehicle system, having the battery system 100 installed therein, is started up and enters a traveling state, the battery system 100 becomes connected to the inverter 400 under management executed by the vehicle control unit 200. The inverter 400 then uses energy stored in the assembled battery 110 to drive the motor generator 410. In a regenerative operation, on the other hand, the assembled battery 110 is charged with power generated at the motor generator 410.

As the battery system 100 becomes connected to a charger 420 via relays 320 and 330, the assembled battery 110 is charged with a charge current provided from the charger 420 until a predetermined condition is satisfied. The energy stored in the assembled battery 110 through the charge operation is utilized when the vehicle is next engaged in traveling operation and is also utilized for operation of electric components and the like installed at the interior and exterior of the vehicle. Furthermore, the energy may be released into an external power system, a typical example of which is a home power system, as necessary. It is to be noted that the charger 420 is installed in an external power system, typical examples of which include a home power system and a public charging station. As the vehicle, having installed therein the battery system 100, is connected to any of these power systems, the battery system 100 and the charger 420 become connected based upon information provided by the vehicle control unit 200.

Figure 2:
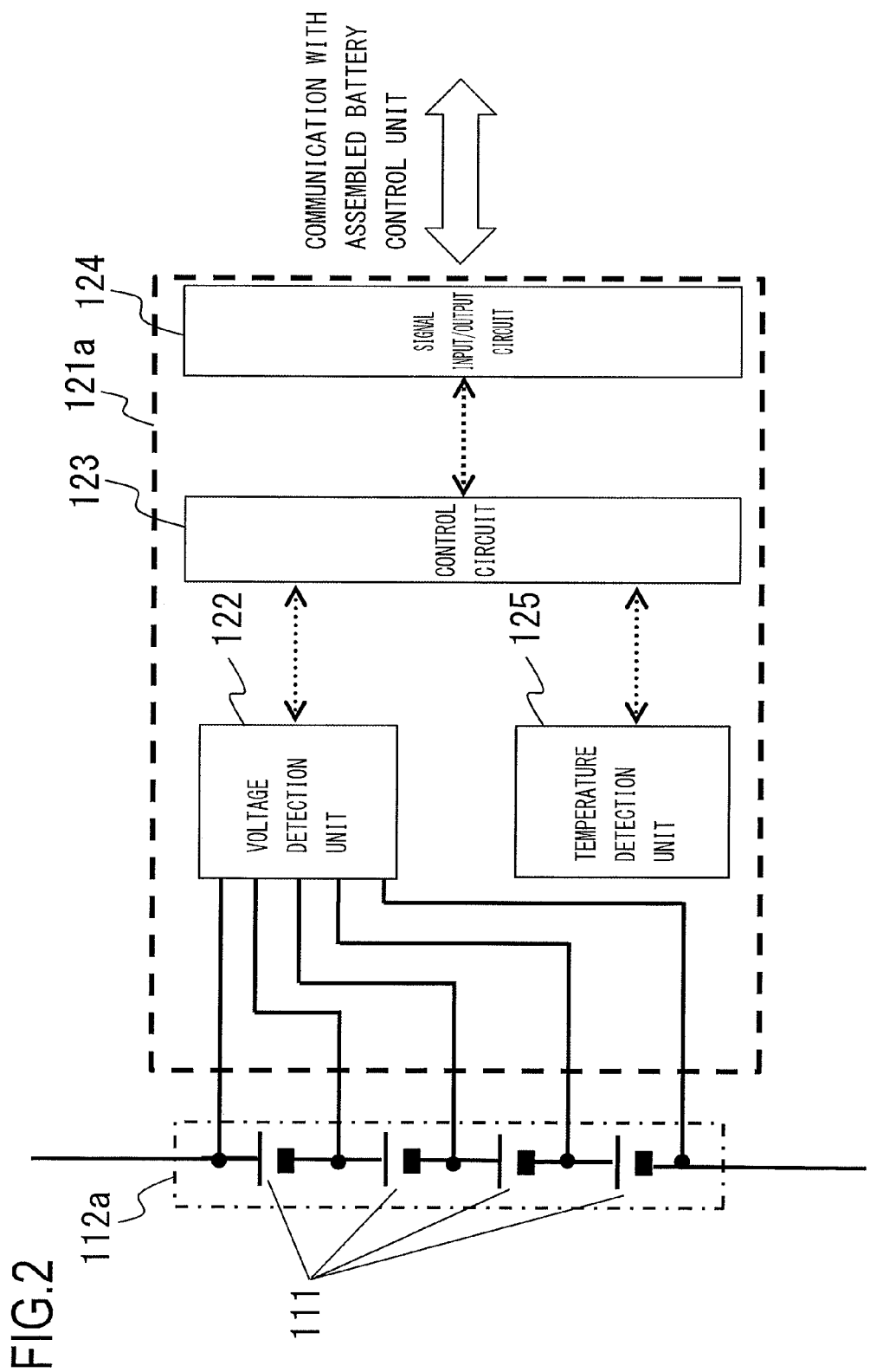

FIG. 2 is a diagram illustrating the circuit structure in the battery cell control unit 121a. As FIG. 2 shows, the battery cell control unit 121a comprises a voltage detection unit 122, a control circuit 123, a signal input/output circuit 124 and a temperature detection unit 125. It is to be noted that the battery cell control unit 121a and the battery cell control unit 121b in FIG. 1 assume circuit structures similar to each other. For this reason, the circuit structure in the battery cell control unit 121a alone is shown as a representative example in FIG. 2.

The voltage detection unit 122 measures the voltage between the terminals at each battery cell 111 (the voltage across each battery cell). The control circuit 123 receives the measurement results provided by the voltage detection unit 122 and the temperature detection unit 125 and transmits the measurement results thus received to the assembled battery control unit 150 via the signal input/output circuit 124. It is to be noted that although not shown in FIG. 2, the battery cell control unit 121a includes an equalizer circuit component of the known art that is used to minimize the variance among voltages and states of charge at the individual battery cells 111, attributable to self discharge, differences in the level of current consumed and the like. The operation of this circuit is controlled by the control circuit 123.

The temperature detection unit 125 in FIG. 2 has a function of measuring the temperature in the battery cell group 112a. The temperature detection unit 125 measures a single temperature for the entire battery cell group 112a and uses the temperature thus measured as a representative temperature value for the temperatures at the individual battery cells 111 forming the battery cell group 112a. The temperature measurement results provided by the temperature detection unit 125 are used for various types of arithmetic operations executed in the assembled battery control unit 150 in order to detect the states of the battery cells 111, the battery cell group 112a and the assembled battery 110. The temperature measured by the temperature detection unit 125 is used as the temperature at the individual battery cells 111 in the battery cell group 112a, as well as the temperature of the battery cell group 112a. In addition, the temperature of the assembled battery 110 may be determined by the assembled battery control unit 150 by, for instance, averaging the temperature of the battery cell group 112a measured by the temperature detection unit 125 in the battery cell control unit 121a and the temperature of the battery cell group 112b measured by the temperature detection unit 125 in the battery cell control unit 121b.

It is to be noted that FIG. 2 shows a single temperature detection unit 125 installed in the battery cell control unit 121a. However, the present invention is not limited to this example and a temperature detection unit 125 may be disposed in correspondence to each battery cell 111 so as to measure the temperature at the particular battery cell 111 and enable the assembled battery control unit 150 to execute various types of arithmetic operations based upon the measurement results corresponding to the individual battery cells. However, it must be borne in mind that a greater number of temperature detection units 125 in this alternative is bound to complicate the structure of the battery cell control unit 121a. As a further alternative, a single temperature detection unit 125 may be installed for the entire assembled battery 110.

It is to be noted that while the temperature detection unit 125 is shown as a single block for schematic representation in FIG. 2, a temperature sensor is installed in conjunction with the battery cell group 112a, i.e., the temperature measurement target, and this temperature sensor outputs the temperature information as a voltage signal in the actual configuration. The control circuit 123 executes an arithmetic operation to determine the temperature of the battery cell group 112a based upon the voltage signal and temperature measurement results for the battery cell group 112a are thus obtained. The temperature measurement results of the arithmetic operation executed by the control circuit 123 are transmitted to the signal input/output circuit 124, which, in turn, outputs the temperature measurement results to a recipient outside the battery cell control unit 121a. The function enabling this flow of processing is included as the temperature detection unit 125 in the battery cell control unit 121a. It is to be noted that the voltage signal output from the temperature sensor may be measured by the voltage detection unit 122 instead.

Figure 3:
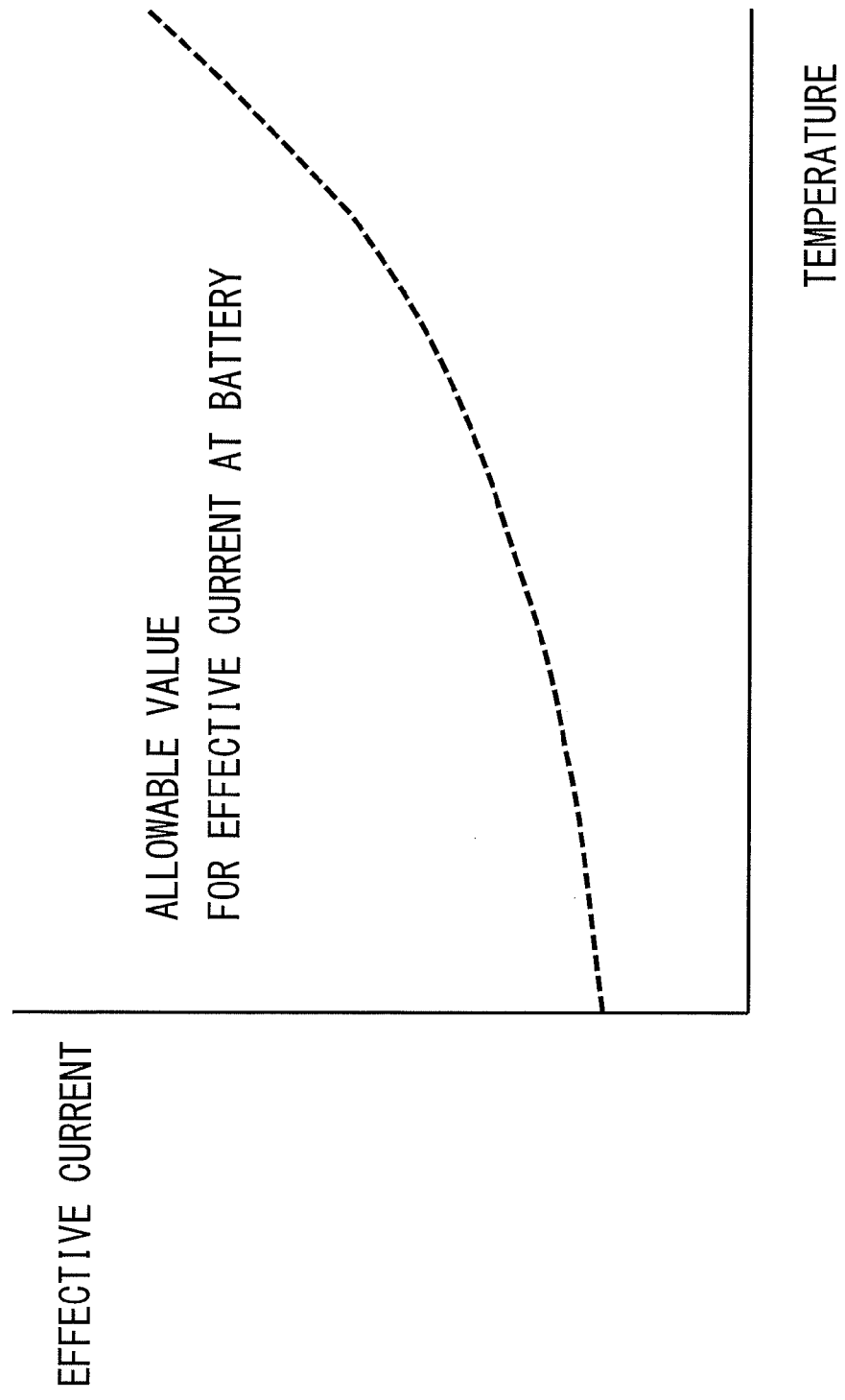

Next, charge/discharge restrictions that may be imposed upon the assembled battery 110 will be described. FIG. 3 is a diagram presenting an example of a relationship that may be achieved by the temperature and the allowable value for the effective current (root mean square current) at a standard battery. As FIG. 3 indicates, the allowable value for the effective current at the battery changes in correspondence to the temperature. Namely, since the degradation curve indicates degradation occurring under high-load operating conditions even at a low effective current when the battery temperature is lower, it is necessary to set a lower allowable value.

Figure 4:
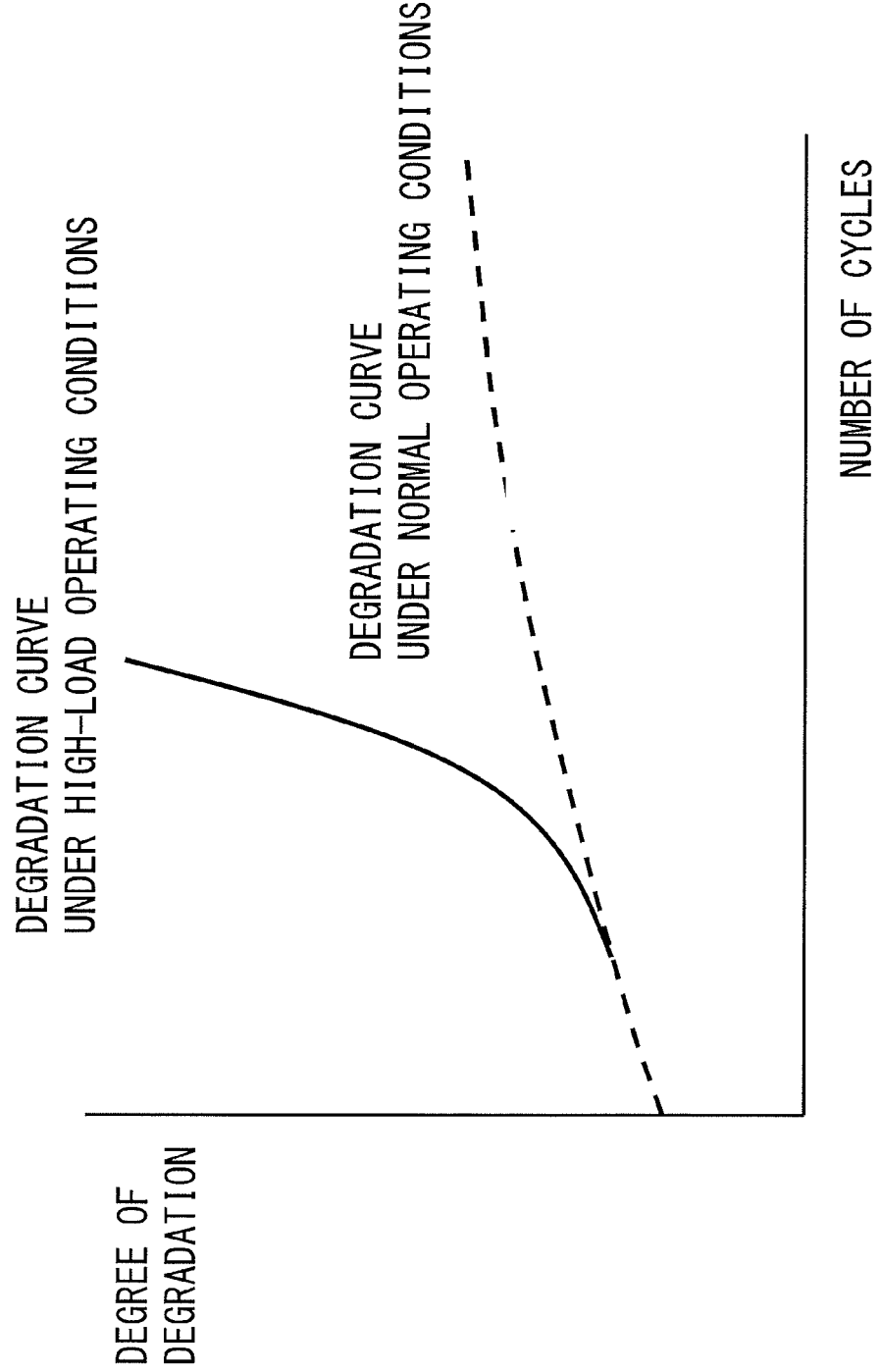

FIG. 4 presents an example of a relationship that may be achieved by the number of battery operation cycles and the extent of degradation. As indicated by the dotted line in FIG. 4, the battery becomes gradually degraded as the number of battery operation cycles increases as long as the effective current remains equal to or less than the allowable value under normal operating conditions. When the battery is used under high-load conditions with the effective current exceeding the allowable value, the internal resistance value temporarily spikes as the number of battery operation cycles increases and thus, the battery appears to become degraded rapidly, as indicated by the solid line in FIG. 4. Under the latter circumstances, the battery can no longer operate at its full performance level.

Accordingly, charge/discharge restrictions are imposed by the assembled battery control unit 150 in order to prevent deterioration in the performance of the assembled battery 110 in a low-temperature state in the battery control system 120 achieved in the embodiment. These charge/discharge restrictions will be described in detail next.

Figure 5:
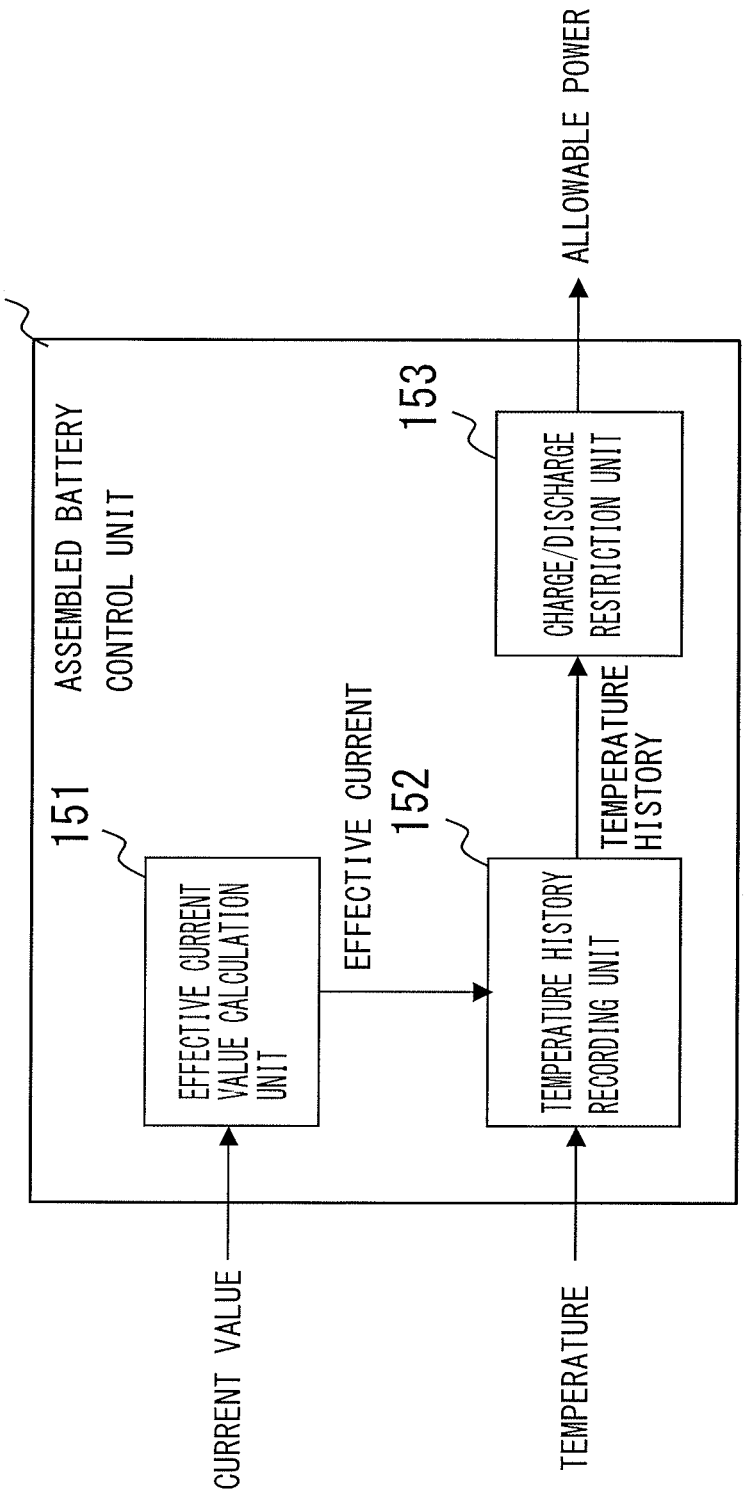

FIG. 5 is a diagram showing the control blocks in the assembled battery control unit 150 that are involved in the charge/discharge restrictions. The assembled battery control unit 150 includes the following functional control blocks; an effective current value calculation unit 151, a temperature history recording unit 152 and a charge/discharge restriction unit 153, as structural elements for enabling the charge/discharge restrictions at the assembled battery 110.

The current value for the charge/discharge current at the assembled battery 110, measured by the current detection unit 130, is input to the effective current value calculation unit 151. Based upon the current value input thereto, the effective current value calculation unit 151 calculates an effective current value for the charge/discharge current flowing through the assembled battery 110. The method adopted for the effective current value calculation will be described later in detail. The effective current value calculated by the effective current value calculation unit 151 is output to the temperature history recording unit 152.

The temperature of the assembled battery 110 detected via the temperature detection units 125 is input to the temperature history recording unit 152. As long as the effective current value calculated by the effective current value calculation unit 151 is equal to or greater than a predetermined value, the temperature history recording unit 152 records temperatures input thereto over predetermined time intervals as a temperature history. It is to be noted that if the effective current value is less than the predetermined value, the temperature history recording unit 152 does not record any temperature history. The temperature history recorded by the temperature history recording unit 152 is output to the charge/discharge restriction unit 153.

It is to be noted that the temperature history recording unit 152 may record temperature history at all times regardless of whether or not the effective current value is equal to or greater than the predetermined value. In such a case, the assembled battery control unit 150 does not need to include the effective current value calculation unit 151.

Based upon the temperature history recorded in the temperature history recording unit 152, the charge/discharge restriction unit 153 determines the highest temperature at the assembled battery 110 over a predetermined continuous time length and makes a decision, based upon the highest temperature, as to whether or not to restrict the charge/discharge current at the assembled battery 110. Then, upon deciding that the charge/discharge current is to be restricted, it determines a value for the allowable power corresponding to the charge/discharge current subjected to the restriction and outputs the value thus determined to the vehicle control unit 200 and to the battery cell control units 121a and 121b. Through this process, a charge/discharge restriction is imposed on the assembled battery 110 so as to restrict the charge/discharge current.

The control blocks described above enable the assembled battery control unit 150 to impose charge/discharge restrictions over two phases at the assembled battery 110 in a low-temperature state. In more specific terms, the highest temperature at the assembled battery 110 is compared with a predetermined first threshold value and a first-phase charge/discharge restriction is imposed if the highest temperature is lower than the first threshold value. In addition, the highest temperature at the assembled battery 110 is compared with a predetermined second threshold value lower than the first threshold value and a further charge/discharge restriction is imposed as a second-phase charge/discharge restriction if the highest temperature is lower than the second threshold value.

Figure 6:
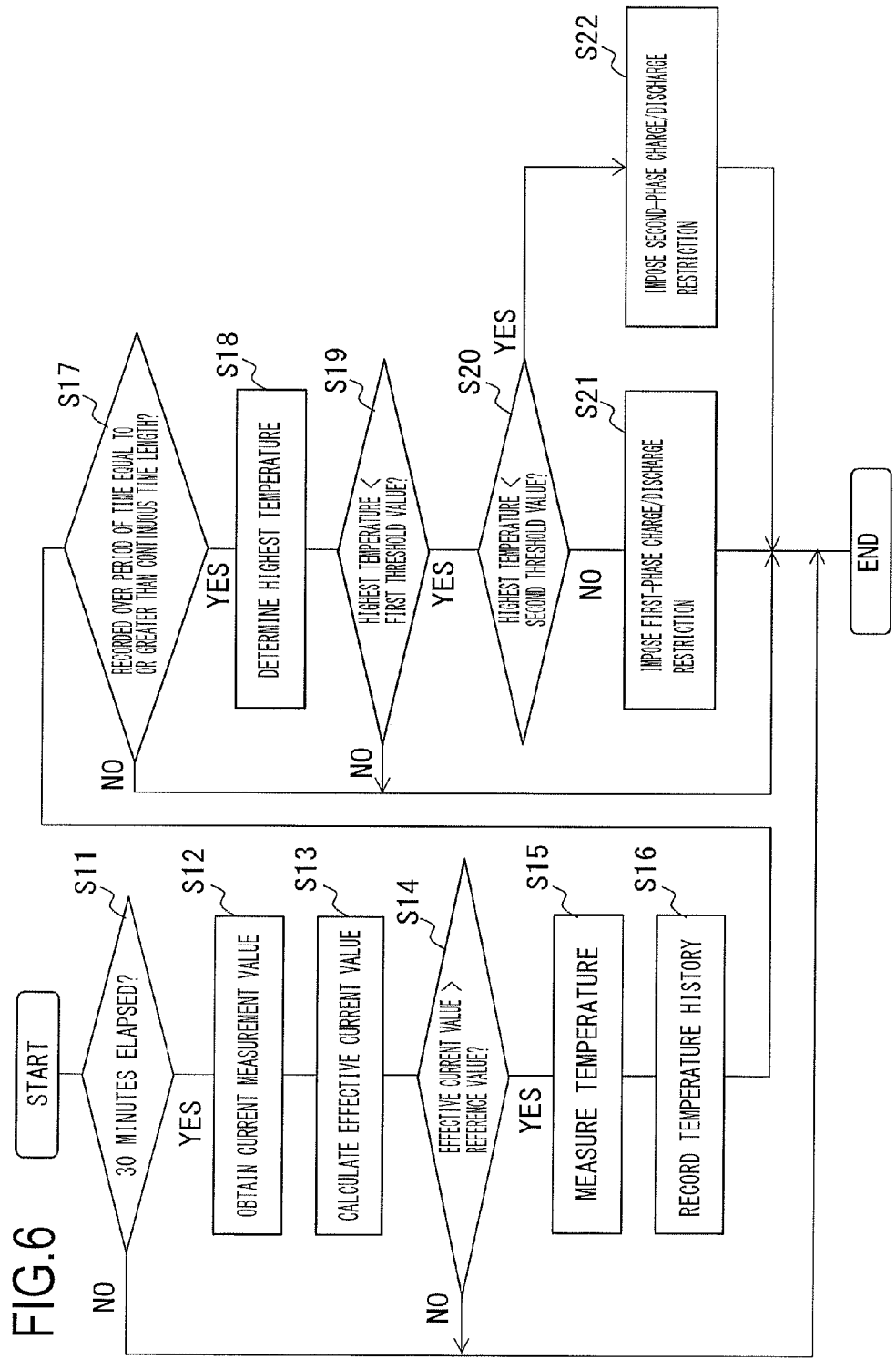

The charge/discharge restrictions described above are imposed through the processing executed as shown in the flowchart presented in FIG. 6. The processing in the flowchart is executed in the assembled battery control unit 150 in each predetermined processing cycle.

In step S11, the assembled battery control unit 150 makes a decision as to whether or not 30 minutes have elapsed since charge/discharge started at the assembled battery 110 or since temperature history was last recorded. If 30 minutes have elapsed, the operation proceeds to step S12, whereas the processing in the flowchart presented in FIG. 6 ends if 30 minutes have not elapsed. It is to be noted that while an explanation is given by assuming that temperature history is recorded over 30-minute time intervals, temperature history may instead be recorded over different time intervals and may be recorded over, for instance, 10-minute time intervals or one-hour time intervals instead of 30-minute time intervals. The decision-making processing in step S11 is executed in correspondence to the specific time intervals over which temperature history is recorded at the assembled battery control unit 150.

In step S12, the assembled battery control unit 150 obtains the current measurement value from the current detection unit 130. A current measurement value, which is output from the current detection unit 130 after each predetermined sampling interval, is obtained and stored in this step.

In step S13, the assembled battery control unit 150 engages the effective current value calculation unit 151 in operation so as to calculate an effective current value in a predetermined time window based upon the current measurement value having been obtained in step S12. The length of the time window may be, for instance, 30 minutes, matching the decision-making criterion used in step S11, and in such a case, the effective current value for the time window can be calculated by determining the mean square value of the individual current measurement values obtained over the predetermined sampling intervals during the most recent 30-minute period and calculating the square root of the mean square value. It is to be noted that the length of the time window over which the effective current value is calculated in step S13 may assume a length other than 30 minutes.

In step S14, the assembled battery control unit 150 engages the temperature history recording unit 152 in operation so as to compare the effective current value having been calculated in step S13 with a predetermined reference value. In this step, a decision is made as to whether or not the effective current value is greater than the reference value set at, for instance, 10 A. If it is decided that the effective current value is greater than the reference value (10 A), the operation proceeds to step S15, whereas if it is less than the reference value, the processing in the flowchart presented in FIG. 6 ends.

In step S15, the assembled battery control unit 150 measures the temperature at the assembled battery 110 via the temperature history recording unit 152. In this step, the temperature at the assembled battery 110 is measured by obtaining the temperature detection results output by the temperature detection units 125.

In step S16, the assembled battery control unit 150 engages the temperature history recording unit 152 in operation to record current (most recent) temperature history by entering the temperature at the assembled battery 110, having been measured in step S15. For instance, the temperature history may be recorded in a table at the temperature history recording unit 152, and in such a case, the temperature measurement results having been obtained in step S15 are added into the corresponding field in the temperature history table so as to update the contents of the temperature history table. Temperature history can be recorded in step S13 through this procedure.

FIG. 7 presents an example of a temperature history table that may be recorded at the temperature history recording unit 152. In the temperature history table in the example presented in FIG. 7, a temperature history at the assembled battery 110, spanning a continuous time period from the current (most recent) time point through the time point two hours previous, is recorded by entering the temperature at successive time points every 30 minutes.

The temperature history recording unit 152 is able to record temperature history at the assembled battery 110 over predetermined time intervals by using a temperature history table such as that shown in FIG. 7, as long as the vehicle system is in the operating state and the assembled battery 110 is continuously charged/discharged. It is desirable that once the vehicle system enters an OFF state and charge/discharge at the assembled battery 110 stops, the temperature history recording unit 152 deletes the contents of the temperature history table shown in FIG. 7 having been recorded up to that time at the temperature history recording unit 152. Then, when charge/discharge at the assembled battery 110 next starts, it should resume recording of temperature history at the assembled battery 110 by using a new temperature history table.

FIG. 8 presents another example of a temperature history table that may be recorded at the temperature history recording unit 152. In the temperature history table in the example presented in FIG. 8, temperature history at the assembled battery 110, spanning from the current (most current) time point through the time point three hours previous, is recorded by intermittently entering the temperature over 30-minute time intervals. It is to be noted that in the field for the temperature record one hour previous and the field for the temperature record for two hours previous, "X" marks indicating an invalid value are entered so as to indicate that the assembled battery 110 was not in a charge/discharge state.

When the vehicle system is repeatedly switched between the ON state and the OFF state and thus the assembled battery 110 is intermittently charged/discharged, the temperature history recording unit 152 is able to record temperature history at the assembled battery 110 over predetermined time intervals by using a temperature history table such as that shown in FIG. 8. It is desirable that the temperature history recording unit 152 keep recording temperature history by using the temperature history table shown in FIG. 8 even when the vehicle system enters the OFF state and thus charge/discharge at the assembled battery 110 stops. Under these circumstances, it is desirable to enter an invalid value as described earlier in the temperature history table whenever the assembled battery 10 is in the non-charge/discharge state.

In step S17 in FIG. 6, the assembled battery control unit 150 engages the charge/discharge restriction unit 153 in operation so as to make a decision as to whether or not temperature history at the assembled battery 110 has been recorded over a span of time equal to or greater than a predetermined continuous time length at the temperature history recording unit 152. If temperature history has been recorded over a span of time equal to or greater than the predetermined continuous time length, e.g., two hours, the operation proceeds to step S18, whereas if temperature history has not been recorded over a length of time equal to or greater than the predetermined continuous time length, the processing in the flowchart presented in FIG. 6 ends. It is desirable that the continuous time length be set in correspondence to the length of time that elapses before the temperature at the assembled battery 110 reaches the state of equilibrium during charge/discharge.

It is desirable that if temperature history at the assembled battery 110 is continuously recorded even through a non-charge/discharge period by using a temperature history table such as that shown in FIG. 8 as described earlier, the decision-making in step S17 as to whether or not the temperature history has been recorded over a span of time equal to or greater than the continuous time length be executed by excluding this non-charge/discharge period. More specifically, an "X" mark indicating an invalid value is recorded in both the temperature record fields for one hour previous and two hours previous in the temperature history table in FIG. 8. Accordingly, a decision may be made in step S17 by skipping these fields and assuming that temperature history spanning a time period equivalent to two hours is recorded in the temperature history table in FIG. 8.

In step S18, the assembled battery control unit 150 engages the charge/discharge restriction unit 153 in operation to determine the highest temperature at the assembled battery 110 over the continuous time length described above based upon the temperature history at the assembled battery 110 recorded at the temperature history recording unit 152. In this step, the highest temperature at the assembled battery 110 within the continuous time length can be determined by selecting the highest temperature in the temperature history having been recorded over the period of time spanning from the current time point to the time point preceding the current time point by the continuous time length.

For instance, assuming that the continuous time length is two hours, the highest temperature among a total of five temperature entries having been recorded successively over the period of time spanning from the time point two hours previous to the current time point in the temperature history table shown in FIG. 7, is selected. In this example, the current temperature (−9° C.) is the highest. Accordingly, the highest temperature at the assembled battery 110 is determined to be −9° C. in step S18.

In the temperature history table shown in FIG. 8, on the other hand, the fields where the invalid value marks are entered are disregarded and the highest temperature among a total of five temperature entries recorded over an actual time span of two hours at intermittent time points falling into a time range defined by the time point preceding the current time point by three hours and the current time point, is selected. In this case, too, the current temperature (−9° C.) is the highest, as in the example presented in FIG. 7. Accordingly, the highest temperature at the assembled battery 110 is determined to be −9° C. in step S18.

Based upon the temperature history at the assembled battery 110 recorded by the temperature history recording unit 152, the charge/discharge restriction unit 153 is able to determine the highest temperature at the assembled battery 110 as the assembled battery 110 is continuously or intermittently charged/discharged over a length of time equal to or greater than the predetermined continuous time length, as described above.

In step S19, the assembled battery control unit 150 engages the charge/discharge restriction unit 153 in operation to compare the highest temperature at the assembled battery 110 having been determined in step S18 with a predetermined first threshold value. If the highest temperature is lower than the first threshold value, the operation proceeds to step S20, whereas if the highest temperature is equal to or higher than the first threshold value, the processing in the flowchart presented in FIG. 6 ends.

In step S20, the assembled battery control unit 150 engages the charge/discharge restriction unit 153 in operation to compare the highest temperature at the assembled battery 110 having been determined in step S18 with a predetermined second threshold value. This second threshold value is a value lower than the first threshold value used in the decision-making in step S19. If the highest temperature is equal to or higher than the second threshold value, the operation proceeds to step S21, whereas if the highest temperature is lower than the second threshold value, the operation proceeds to step S22.

It is desirable that the first and second threshold values used in the decision-making executed in steps S19 and S20 as described above each be set in correspondence to the continuous time length used in the decision-making executed in step S17. FIG. 9 presents examples of values that may be set for the continuous time length and the first and second threshold values. As FIG. 9 indicates, when the continuous time length is two hours, 5° C. and −5° C., for instance, may be set for the first threshold value and the second threshold value respectively. As the value set for the continuous time length increases to four hours and eight hours, the values set for the individual threshold values, too, gradually increase, i.e., the value set for the first threshold value increases to 15° C. and then to 25° C. and the value set for the second threshold value increases to 0° C. and then to 5° C. It is to be noted that these value settings simply represent examples and values that may be actually selected are not limited to these examples.

In step S21, the assembled battery control unit 150 engages the charge/discharge restriction unit 153 in operation so as to impose a first-phase charge/discharge restriction on the assembled battery 110. In more specific terms, it determines an allowable electric power value corresponding to the charge/discharge current subjected to the restriction based upon a relationship between the temperature and the allowable effective current value such as that shown in FIG. 3 and outputs the value thus determined to the vehicle control unit 200 and to the battery cell control units 121a and 121b so as to execute control to ensure that the input/output power at the assembled battery 110 in the charge/discharge state remains equal to or less than the allowable power value. Once step S21 has been executed, the assembled battery control unit 150 ends the processing in the flowchart presented in FIG. 6.

In step S22, the assembled battery control unit 150 engages the charge/discharge restriction unit 153 in operation so as to impose a second-phase charge/discharge restriction on the assembled battery 110. In more specific terms, it determines an allowable power value corresponding to the charge/discharge current subjected to the restriction, as in step S21 described above, and executes control to ensure that input/output power at the assembled battery 110 in a charge/discharge state remains equal to or lower than the allowable power value by outputting the value having been determined to the vehicle control unit 200 and to the battery cell control units 121a and 121b. It is desirable that the charge/discharge current subjected to the restriction used in the processing executed in this step take a value lower than the charge/discharge current subjected to the restriction imposed in step S21. Once step S22 has been executed, the assembled battery control unit 150 ends the processing in the flowchart presented in FIG. 6.

Through the processing executed as described above by the assembled battery control unit 150, the charge/discharge restrictions can be imposed on the assembled battery 110 over two phases in the low-temperature state.

FIG. 10 presents a diagram illustrating how the effective current may change when the first and second-phase charge/discharge restrictions are imposed. As FIG. 10 indicates, the effective current value remains relatively high over the period of time leading up to a time point Ta, during which no charge/discharge restriction is imposed and the assembled battery 110 is utilized in a normal manner. Once the first-phase charge/discharge restriction is imposed at the time point Ta, the effective current is sustained at low levels. Then, after the second-phase charge/discharge restriction is imposed at a subsequent time point Tb, the effective current is sustained at even lower levels.

It is to be noted that in case that the first-phase charge/discharge restriction is imposed in step S21, the charge/discharge restriction is cleared when a negative decision is made in step S19 in a subsequent processing cycle.

Unlike the first-phase charge/discharge restriction, in case that the second-phase charge/discharge restriction is imposed in step S22, the charge/discharge restriction is not cleared even if a negative decision is made in step S19 or in step S20 in a subsequent processing cycle. In the case of the second-phase charge/discharge restriction, it is desirable to calculate the length of time having elapsed since the charge/discharge restriction came into effect in step S22 and clear the charge/discharge restriction imposed on the assembled battery 110 having been imposed in step S22 if the length of elapsed time exceeds a predetermined restriction clearance time. In more specific terms, it executes control so as to restore the initial setting for the allowable power with regard to the input/output power at the assembled battery 110 during the charge/discharge operation by outputting the allowable power value in place before the charge/discharge restriction started in step S22 to the vehicle control unit 200 and to the battery cell control units 121a and 121b.

It is to be noted that in the processing described above a built-in timer in the assembled battery control unit 150, for instance, may be used to calculate the length of time having elapsed since imposition of the charge/discharge restriction. As an alternative, information indicating the length of time having elapsed since imposition of the charge/discharge restriction may be obtained from the vehicle control unit 200 in FIG. 1 through communication carried out via the CAN mentioned earlier and the length of elapsed time may be calculated based upon the information thus obtained. If there has been a period of time following the charge/discharge restriction came into effect over which the vehicle system has been off and the battery control system 120 has remained a non-operating state, it is desirable that the length of elapsed time calculated in this step include this period.

The following operations and advantages are achieved through the embodiment of the present invention described above.

(1) The battery control system 120 is connected to an assembled battery 110 and controls charge/discharge at the assembled battery 110. The battery control system 120 comprises a current detection unit 130 that measures a current value by detecting an electric current flowing through the assembled battery 110, a voltage detection unit 140 that detects a voltage at the assembled battery 110, a temperature detection unit 125 that detects a temperature at the assembled battery 110 and an assembled battery control unit 150. The assembled battery control unit 150 has functions fulfilled in the form of a temperature history recording unit 152 that records a history of the temperature detected by the temperature detection unit 125 and a charge/discharge restriction unit 153 that restricts the charge/discharge current in a low-temperature state based upon the temperature history recorded by the temperature history recording unit 152. As a result, a charge/discharge restriction can be imposed in an optimal manner in a low-temperature state.

(2) The charge/discharge restriction unit 153 determines, based upon the temperature history recorded by the temperature history recording unit 152 in step S16, the highest temperature at the assembled battery 110 as the assembled battery 110 is continuously or intermittently charged/discharged over a predetermined continuous time length (steps S17, S18), and compares the highest temperature with predetermined threshold values (steps S19, S20). Since a decision as to whether or not to restrict the charge/discharge current is made through such a process, a charge/discharge restriction can be imposed in the low-temperature state under optimal conditions.

(3) The continuous time length mentioned above may be set in correspondence to the length of time that elapses before or until the temperature at the assembled battery 110 reaches the state of equilibrium during charge/discharge. By setting the continuous time length as described above, the highest temperature at the assembled battery 110, as it is charged/discharged in the low-temperature state can be correctly determined.

(4) In addition, as FIG. 9 indicates, varying time lengths may be set for the continuous time length. In this case, the threshold values used in the decision-making executed in steps S19 and S20 each take on a greater value when the continuous time length is greater. Through these measures, a decision as to whether or not to restrict the charge/discharge current can be made by using optimal threshold values in correspondence to the length of time over which the assembled battery 110 has been charged/discharged either continuously or intermittently.

(5) At the charge/discharge restriction unit 153, a first threshold value to be used for the decision-making executed in step S19 is set and also a second threshold value, lower than the first threshold value, to be used in the decision-making executed in step S20 is set. If the highest temperature is lower than the first threshold value, the charge/discharge restriction unit 153 imposes a first charge/discharge restriction to restrict the charge/discharge current (step S21), and if the highest temperature is lower than the second threshold value, it imposes a second charge/discharge restriction so as to further restrict the charge/discharge current (step S22). Through this process, charge/discharge restrictions are imposed over two phases on the assembled battery 110 and, as a result, a decrease in the performance level of the assembled battery 110 in a low-temperature state can be reliably prevented.

(6) The charge/discharge restriction unit 153, having imposed the first charge/discharge restriction in step S21, clears the first charge/discharge restriction when the highest temperature subsequently exceeds the first threshold value. However, once the second charge/discharge restriction is imposed in step S22, the second charge/discharge restriction continuously remains in effect even if the highest temperature subsequently exceeds the second threshold value. Since the second charge/discharge restriction continuously remains in effect through these measures, a decrease in the performance level of the assembled battery 110 in a low-temperature state can be prevented even more reliably.

(7) When the length of time having elapsed since the second charge/discharge restriction came into effect becomes greater than a predetermined restriction clearance time, the charge/discharge restriction unit 153 clears the second charge/discharge restriction. As a result, after the second charge/discharge restriction is imposed, the initial state can be restored by clearing the second charge/discharge restriction with optimal timing.

(8) The battery control system 120 is connected to a CAN, i.e., an in-vehicle communication network. The charge/discharge restriction unit 153 is thus able to obtain information pertaining to the elapsed time length via the CAN as well. This means that the second charge/discharge restriction can be cleared with optimal timing even if the battery control system 120 does not have a timer function.

(9) The assembled battery control unit 150 has another function achieved in the form of an effective current value calculation unit 151 that calculates, based upon the current value measured by the current detection unit 130, the effective current value in a predetermined time window. The temperature history recording unit 152 makes a decision (step S14) as to whether or not the effective current value calculated by the effective current value calculation unit 151 is less than a predetermined reference value, and does not enter a temperature in the temperature history if the effective current value is less than the reference value. Through these measures, it is possible to skip any redundant temperature history recording whenever the charge/discharge current flowing at the assembled battery 110 is small and thus there is no concern for performance deterioration in a low-temperature state.

It is to be noted that some or all of the control blocks in the assembled battery control unit 150 shown in FIG. 5, which are involved in the charge/discharge restrictions, may be allocated in the vehicle control unit 200. For instance, the functions of the effective current value calculation unit 151 and the temperature history recording unit 152 may be fulfilled at the assembled battery control unit 150 and the function of the charge/discharge restriction unit 153 may be fulfilled at the vehicle control unit 200. In this configuration, the assembled battery control unit 150 transmits information indicating the temperature history at the assembled battery 110 recorded in the temperature history recording unit 152 to the vehicle control unit 200. Based upon the temperature history information transmitted thereto from the assembled battery control unit 150, the vehicle control unit 200 makes a decision as to whether or not to impose, via the charge/discharge restriction unit 153, the first charge/discharge restriction or the second charge/discharge restriction in a low-temperature state, and issues an instruction pertaining to either charge/discharge restriction to the battery control system 120 based upon the decision-making results. Through these alternative measures, advantages similar to those having been described earlier can be achieved.

In addition, the reference value compared with the effective current value when making a decision as to whether or not to enter a temperature in the temperature history, the time intervals over which the temperature history is recorded, the continuous time length in correspondence to which the highest temperature is determined and the like used in the embodiment described above simply represent examples, and the present invention may be adopted in conjunction with other values. Furthermore, while the length of time having elapsed since the start of the second-phase charge/discharge restriction is calculated and a decision as to whether or not to clear the second-phase charge/discharge restriction is made by comparing the length of elapsed time thus calculated with a restriction clearance time in the embodiment described above, a decision as to whether or not to clear the second-phase charge/discharge restriction may instead be made by calculating a total length of time over which the second-phase charge/discharge restriction has been in effect and comparing this total time length with the restriction clearance time. In this case, if there has been a period of time after the charge/discharge restriction came into effect, over which the vehicle system has been turned off and the battery control system 120 has been, therefore, in a non-operating state, it is desirable to calculate the total length of time by excluding this period.

It is to be noted that the present invention is in no way limited to the particulars of the embodiment and variations thereof described above, and any other mode conceivable within the technical range of the present invention should be considered to be within the scope of the present invention.

In addition, all or some of the various structural elements and the various functions described above may be achieved in hardware by using, for instance, an integrated circuit or as a program or software executed by a processor. Information such as a program, a table and the like, needed to enable the various functions, may be stored in a storage device such as a memory or a hard disk, or in a storage medium such as an IC card or a DVD.

The disclosure of the following priority application is herein incorporated by reference:

Japanese Patent Application No. 2013-166800, filed Aug. 9, 2013

REFERENCE SIGNS LIST

100: battery system, 110: assembled battery, 111: battery cell, 112*a*, 112*b*: battery cell group, 120: battery control system, 121*a*, 121*b*: battery cell control unit, 122: voltage detection unit, 123: control circuit, 124: signal input/output circuit, 125: temperature detection unit, 130: current detection unit, 140: voltage detection unit, 150: assembled battery control unit, 151: effective current value calculation unit, 152: temperature history recording unit, 153: charge/discharge restriction unit, 160: signal communication path, 170: insulator element, 180: storage unit, 200: vehicle control unit, 300, 310, 320, 330: relay, 400: inverter, 410: motor generator, 420: charger

The invention claimed is:

1. A battery control system connected to a battery, which controls charge/discharge at the battery, comprising:
 a memory configured to store data;
 a processor in communication with the memory and configured to:
 record a plurality of temperature values acquired at the battery over time;
 determine if a first period of time has elapsed since: a start of charge/discharge at the battery; or
 a recording of each of the plurality of temperature values acquired at the battery;
 when the first period of time is determined to elapse;
 obtain a plurality of current values measured over a second period of time,
 each measured current value corresponding to charge/discharge current flowing through the battery for a plurality sampling intervals;
 obtain one of the plurality of current values measured for a previous sampling interval;
 calculate an effective current value as a square root of a mean square value of the plurality of current values;
 determine if the effective current value is greater than a predetermined current value;
 if the effective current value is determined to be greater than the predetermined current value, and restrict the charge/discharge current flowing through the battery in a low-temperature state based upon the recorded plurality of temperature values acquired at the battery.

2. The battery control system according to claim 1, wherein the processor is further configured to:
   determine whether to restrict the charge/discharge current based upon the plurality of temperature values, a highest temperature at the battery as the battery is charged/discharged continuously or intermittently over a period of time equal to or greater than a predetermined continuous time period;
   and compare the highest temperature with a predetermined threshold value.

3. The battery control system according to claim 2, wherein:
   the continuous time period is set in correspondence to a period of time to elapse until the temperature at the battery enters a state of equilibrium during charge/discharge.

4. The battery control system according to claim 2, wherein:
   a plurality of varying time periods are set in correspondence to the continuous time period; and
   the predetermined threshold value takes a greater value in correspondence to the continuous time period as the continuous time period increases.

5. The battery control system according to claim 2, wherein:
   a first threshold value and a second threshold value lower than the first threshold value are set to be used as the threshold value; and
   the processor is further configured to:
      impose a first charge/discharge restriction so as to restrict the charge/discharge current if the highest temperature is lower than the first threshold value and impose a second charge/discharge restriction so as to further restrict the charge/discharge current if the highest temperature is lower than the second threshold value.

6. The battery control system according to claim 5, wherein:
   the processor is further configured to:
   having impose the first charge/discharge restriction, clears the first charge/discharge restriction when the highest temperature subsequently exceeds the first threshold value, and
   having imposed the second charge/discharge restriction, sustain the second charge/discharge restriction even if the highest temperature subsequently exceeds the second threshold value.

7. The battery control system according to claim 6, wherein:
   the processor is further configured to:
   clear the second charge/discharge restriction when a length period of elapsed time having elapsed since the second charge/discharge restriction came into effect or a total period of time over which the second charge/discharge restriction has been in effect exceeds a predetermined restriction clearance time.

8. The battery control system according to claim 7, wherein:
   the battery control system is connected to an in-vehicle communication network; and
   the charge/discharge restriction unit obtains information pertaining to the period of elapsed time or the total period of time via the communication network.

9. The battery control system according to claim 1, wherein if the effective current value is determined to not be greater than the predetermined current value, do not restrict the charge/discharge current flowing through the battery.

10. The battery control system according to claim 1, wherein the processor is further configured to:
   record the plurality of temperature values during the charge/discharge at the battery; and
   delete the plurality of temperature values when the charge/discharge stops.

* * * * *